United States Patent

Bøen

Patent Number: 5,252,049
Date of Patent: Oct. 12, 1993

[54] LUBRICATING ARRANGEMENT FOR PLASTIC EXTRUDERS

[75] Inventor: Per Bøen, Vassholmen, Norway

[73] Assignee: Sonnichsen A.S., Oslo, Norway

[21] Appl. No.: 852,205

[22] PCT Filed: Dec. 17, 1990

[86] PCT No.: PCT/NO90/00190

§ 371 Date: Jun. 4, 1992

§ 102(e) Date: Jun. 4, 1992

[87] PCT Pub. No.: WO91/08891

PCT Pub. Date: Jun. 27, 1991

[30] Foreign Application Priority Data

Dec. 19, 1989 [NO] Norway .................. 895125

[51] Int. Cl.$^5$ .................. B29C 47/02; B29C 47/94
[52] U.S. Cl. .................. 425/97; 425/380
[58] Field of Search ............ 425/96, 97, 133.1, 382.4, 425/107, 92, 380; 264/169

[56] References Cited

U.S. PATENT DOCUMENTS

| | | | |
|---|---|---|---|
| 2,537,977 | 1/1951 | Dulmage | 264/169 |
| 3,907,069 | 9/1975 | Pryor et al. | 425/97 |
| 4,087,222 | 5/1978 | Noel | 425/107 |
| 4,286,935 | 9/1981 | Okuno et al. | 425/97 |
| 4,591,323 | 5/1986 | Boen | 425/97 |
| 4,657,496 | 4/1987 | Ozeki et al. | 425/133.1 |
| 4,797,245 | 1/1989 | Sonoda | 425/382.4 |
| 4,904,171 | 2/1990 | Greer | 425/97 |
| 4,907,957 | 3/1990 | Nakagawa et al. | 425/133.1 |
| 5,030,077 | 7/1991 | Orimoto et al. | 425/133.1 |

FOREIGN PATENT DOCUMENTS

| | | | |
|---|---|---|---|
| 156679 | 9/1983 | Norway . | |
| 455017 | 4/1975 | U.S.S.R. | 425/107 |
| 722779 | 3/1980 | U.S.S.R. | 425/107 |

OTHER PUBLICATIONS

Goncharov, Abstract no. 88-328468146, *Derwent Publications Ltd.*, 1988.

Primary Examiner—Jay H. Woo
Assistant Examiner—Joseph Leyson
Attorney, Agent, or Firm—Browdy and Neimark

[57] ABSTRACT

This invention is directed to a lubricating arrangement for a plastic extruder (1) for production of cylindrical plastic tubes with a smooth inner surface. The plastic extruder (1) includes a mandrel which consists of a die core (6) which is a cylindrical coaxial extension of an extruder screw (2). Die core (6) rotates together with said screw, and a stationary external die member (7). The lubricating arrangement is located in the external die portion for lubricating its forming surface. The lubricating arrangement has a plurality of radially directed plugs (11, 11', 17, 17'), each plug engaged in a bore (10) in the external die member. The inner end of the plug lies in the die surface. Lubricating ducts (13) are provided to the bore which are connected with a source of a lubricant, which supplies a lubricant under pressure.

1 Claim, 1 Drawing Sheet

LUBRICATING ARRANGEMENT FOR PLASTIC EXTRUDERS

BACKGROUND OF THE INVENTION

1. Field of the Invention

The present invention relates to a lubricating arrangement for a plastic extruder for the production of cylindrical plastic tubes with a smooth inner wall, said plastic extruder comprising a mandrel, consisting of a form core which is a cylindrical coaxial extension of the extruder screw and rotates with the latter, and a stationary external die means with the lubricating arrangement being provided on the external die means for lubricating its forming surface.

2. Prior Art

From NO-PS No. 158 087 such a lubricating arrangement is known which comprises slots between members of the external die means, said members being movable relative to each other in the axial direction of the die for adjustment of the width of slots. The slot or slots are connected with a source of lubricant, supplying lubricant under pressure. In the embodiment preferred in practice the movable members consist of annular disks. This lubricating arrangement does indeed function as intended, and adjustment of the amount of lubricant is very readily achieved by adjusting the slot width. A disadvantage of this lubricating arrangement, however, is that the slots supplying the die wall with lubricant extend radially into the die wall and normally to the centre line of the external die means in the die wall, whereas the supplied plastic mass describes a helical line due to axial forward squeezing of the mass from the extruder and the influence of the rotating mandrel on the plastic mass. The lubricator slots will, thus, form an acute angle to the helical path of the plastic mass, and this will cause non-uniform lubrication, especially at the inlet to the stationary external die means where shaping of the tube profile begins. This will be especially disadvantageous in connection with production of tubes with a smooth inner surface and with ribs following a helical line on their outside. Such extrusion is very sensitive to non-uniform lubrication, and there will easily be a hazard of uneven extrusion on even a hazard of tearing the tube being moulded. It is an object of the present invention to provide an improved lubricating system, in which the above disadvantage is avoided and by means of which lubricating arrangement uniform lubrication is achieved, especially when tubes with a smooth internal surface and a ribbed external surface are manufactured.

OBJECTIVES AND SUMMARY OF THE INVENTION

According to the invention this is achieved by the means of a lubricating arrangement of the above mentioned kind, which is characterized in that a plurality of radially extending plugs are provided with each plug in its bore in the external die means, with an inner end of the plug lying in the surface of the die, that lubricating ducts are provided to said bores said ducts are connected with a source of lubricant supplying lubricant under pressure.

A preferred embodiment is characterized by the fact that plugs are provided in groups, that said groups are arranged about the periphery, and that the plugs of each group are arranged along the helical line followed by the flowing plastic mass being squeezed axially onwards by the extruder screw and due to the influence of the rotating mandrel on the mass. A lubricating arrangement according to the invention which is especially designed for a plastic extruder for production of cylindrical plastic tubes with a smooth inner wall and an external wall provided with helical ribs, is characterized in that the ends of the plugs are shaped to form part of the moulding surface of the external die means, adapted to the ribbed profile of the extruded tube.

In a preferred embodiment the plugs are circular cylindrical and have a conical portion cooperating with a conical portion of the bore, intended to adjust the volume of lubricant by more or less hard tightening of the conical plug portion against the conical bore portion.

By means of the invention more selective lubrication is achieved, and with a sufficient number of lubricating points the entire helical flow will be lubricated simultaneously. Uniform and sufficient lubrication is ensured, especially by the fact that the lubricating points are arranged in groups with lubricating points of each group being arranged along a helical line.

The invention is disclosed in more detail below with reference to the drawings, showing an embodiment of the lubricating arrangement according to the invention.

DETAILED DESCRIPTION OF THE PREFERRED EMBODIMENT

Figure 1:
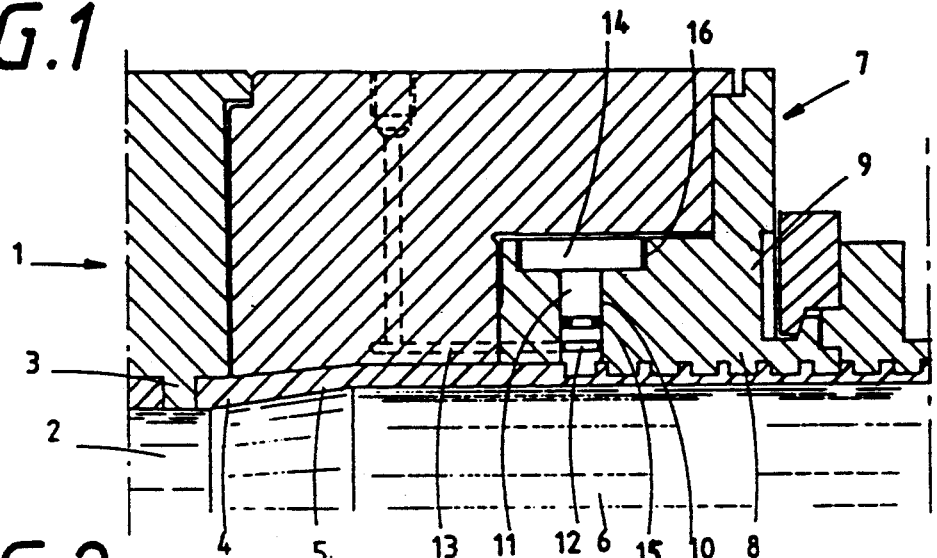
FIG. 1 is a sectional view through part of the die tool of a plastic extruder for the production of a plastic tube with a smooth inner surface and a ribbed external surface.

In the drawing only the distal portion of the feed screw 2 of an extruder 1 is shown. Feed screw 2 squeezes plastic mass 4 through an internally threaded control member 3, and out over a diverging conical transfer member 5 the outlet diameter of which will depend on the diameter of the tube to be formed. The internal die member or mandrel 6 is an elongation of the screw 2 and rotates together with said screw. The plastic mass advanced by the extruder screw will thus be forced to rotate by rotating mandrel 6. The plastic mass being rotated and simultaneously advanced in an axial direction, it will flow outwards along a helical line. In external die member 7 inwards facing ribs 8 are provided along a helical line. In a special annular member 9 of external die member 7 lubricating plugs 11 are inserted in bores 10. At the lower portion of lubricating plugs 11 an annular groove 12 is provided. A lubricating duct 13 extends to the groove 12, and duct 13 is supplied with a lubricant under pressure from a source of lubricant, not shown. The inner end of plug 11 extends to the die surface of external die wall adjacent to a rib 8. To prevent lubricant from being squeezed outwards across head 14 of the plug 11, a sealine ring 15 is provided. Head 14 is fastened by means of bolts in a counterbore 16 in annular shaped member 9.

Figure 2:
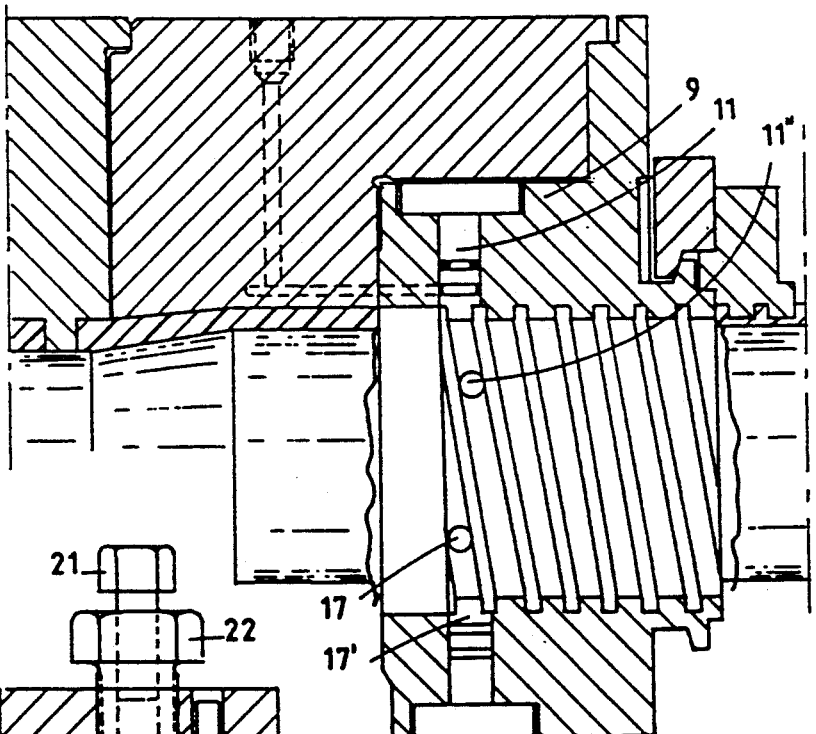
FIG. 2 shows the same as does FIG. 1, but with portions of the mandrel cut away for the sake of clarity.

As will appear from FIG. 2, ribs 8 of external die member constitute a plurality of parallel threads. Adjacent to each rib two plugs 11 and 11' (only the end of plug 11' is shown) are inserted in the embodiment shown in FIG. 2. Said two plugs 11, 11' form a group, and there is such a group for each thread of member 9, e.g. group 17, 17' (only the end of plug 17 is shown). The groups are mutually displaced about the circumference.

Figure 3:
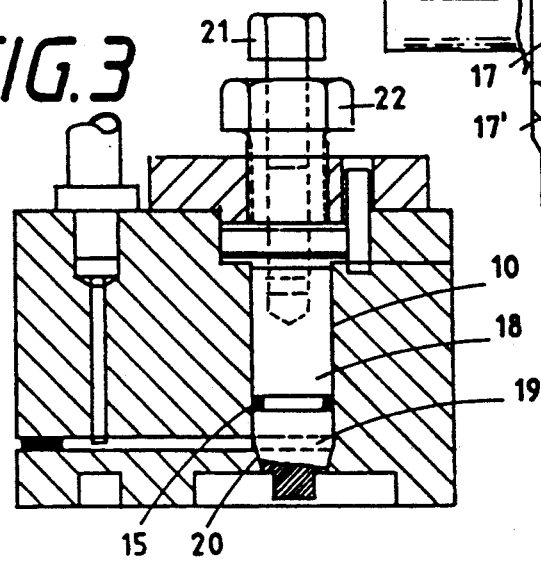
FIG. 3 shows a special embodiment of a lubricating plug according to the invention.

In FIG. 3 a special embodiment of a lubricating plug 18 is shown. Plug 18 is provided with a lower conical portion 19 cooperating with a conical portion 20 of bore 10. By the aid of bolt 21 and counter bolt 22 the slot between conical portion 19 and conical portion 20 is adjustable to adjust the volume of lubricant.

I claim:

1. A lubricating arrangement for a plastic extruder (1) for the production of cylindrical plastic tubes with a smooth inner wall, said arrangement comprising;

a die core (6) which is a cylindrical coaxial extension of an extruder screw (2), said die core rotating with said screw, a stationary external die member (7) having an orifice, said die core extending through said orifice, said lubricating arrangement being located in said external die member (7) for lubricating a die surface of said die member, a plurality of radial directed bores (10) in said external die member (7), wherein each of said plurality of radial directed bores (10) is provided with a plug (11, 11') with an inner end lying in said die surface, a lubricant duct (13) extending to each of said plurality of radial directed bores (10) and connected with a source of lubricant which supplies lubricant under pressure, said lubricant duct supplying lubricant under pressure to said die surface through communication with a slot between each of said plurality of radial directed bores and said plug and thereafter along a circumference of said plug to said die surface.

* * * * *